(No Model.)  3 Sheets—Sheet 1.
J. EMERSON.
DYNAMOMETER.
No. 423,863.  Patented Mar. 18, 1890.
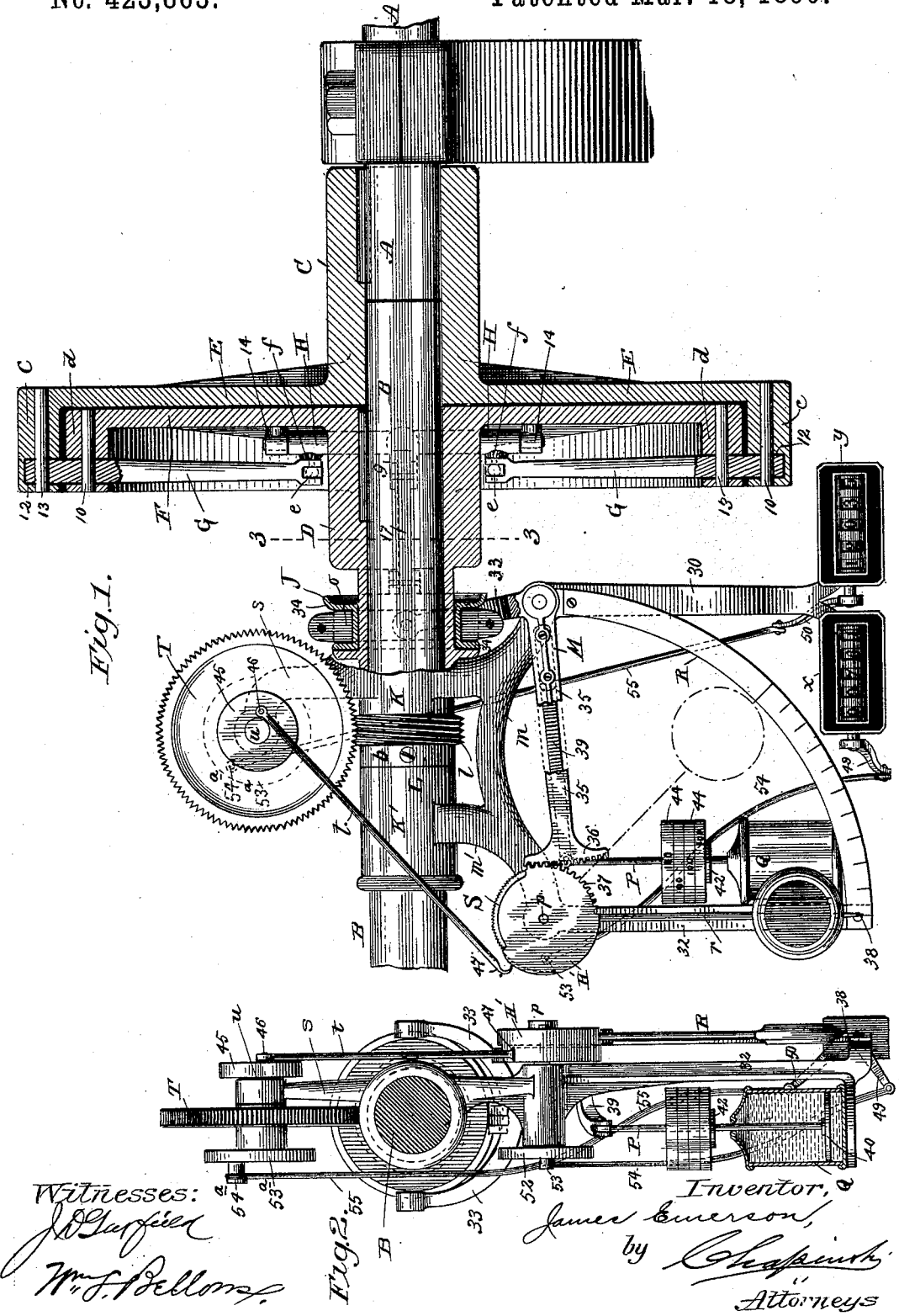

(No Model.) 3 Sheets—Sheet 2.

J. EMERSON.
DYNAMOMETER.

No. 423,863. Patented Mar. 18, 1890.

Witnesses:
Inventor,
James Emerson
by Chapin
Attorneys.

(No Model.) 3 Sheets—Sheet 3.
J. EMERSON.
DYNAMOMETER.
No. 423,863. Patented Mar. 18, 1890.
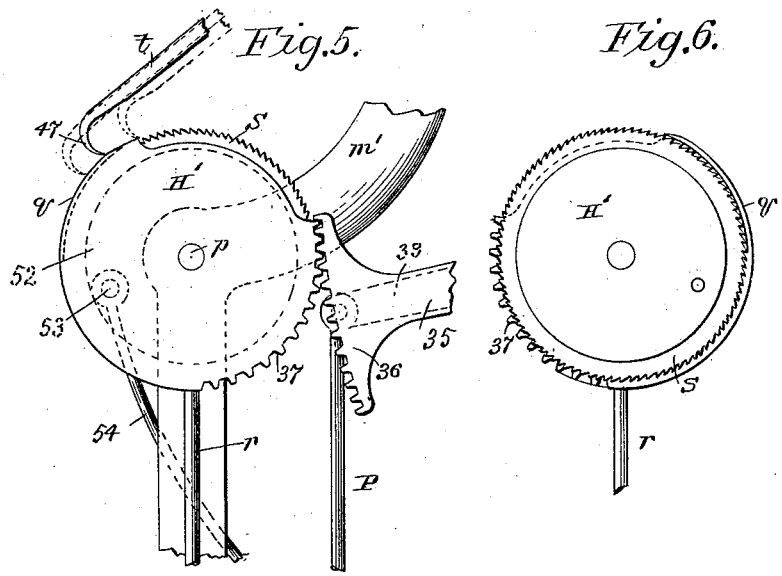
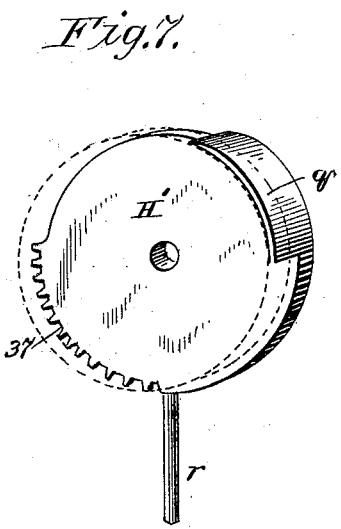
Witnesses:
J. W. Garfield
Wm. S. Bellows
Inventor,
James Emerson
by Chapin
Attorneys

UNITED STATES PATENT OFFICE.

JAMES EMERSON, OF WILLIMANSETT, ASSIGNOR TO THE EMERSON POWER SCALE COMPANY, OF FLORENCE, MASSACHUSETTS.

DYNAMOMETER.

SPECIFICATION forming part of Letters Patent No. 423,863, dated March 18, 1890.

Application filed August 29, 1889. Serial No. 322,382. (No model.)

*To all whom it may concern:*

Be it known that I, JAMES EMERSON, a citizen of the United States, residing at Willimansett, in the county of Hampden and State of Massachusetts, have invented new and useful Improvements in Dynamometers, of which the following is a specification.

This invention in a dynamometer or power-scale, which is to be applied and attached to the shaft of a machine, whereby the amount of power required to drive the machine may be determined, particularly relates to mechanism to be comprised in an instrument of the character indicated, the purpose of which is not only to afford most efficient means for the momentary indication of the power in transmission, but to also provide means for the registering of the accumulations of power employed and to exhibit the same relative to means which are also provided for indicating and registering the velocity of the driving-shaft or other shaft to which the dynamometer may be applied. By the said indicating and registering mechanisms for both velocity and exerted power computations may be readily made to ascertain the number of feet or other units of distance-measurement that the driving-pulley or other fixture on the driving-shaft has carried the resistance, or, as otherwise expressed, the number of pounds or other units of dynamometrical quantity indicated; and the invention consists in the construction and combination of parts, all substantially as hereinafter stated and described, and as particularly set forth and identified by the claims.

In the accompanying drawings, in which similar characters of reference indicate corresponding parts in all the views, the present improvements in automatic registering mechanism for dynamometers are illustrated as applied in operative relation upon and with the mechanism comprised in a dynamometer for primarily and momentarily indicating the resistance.

Figure 3:
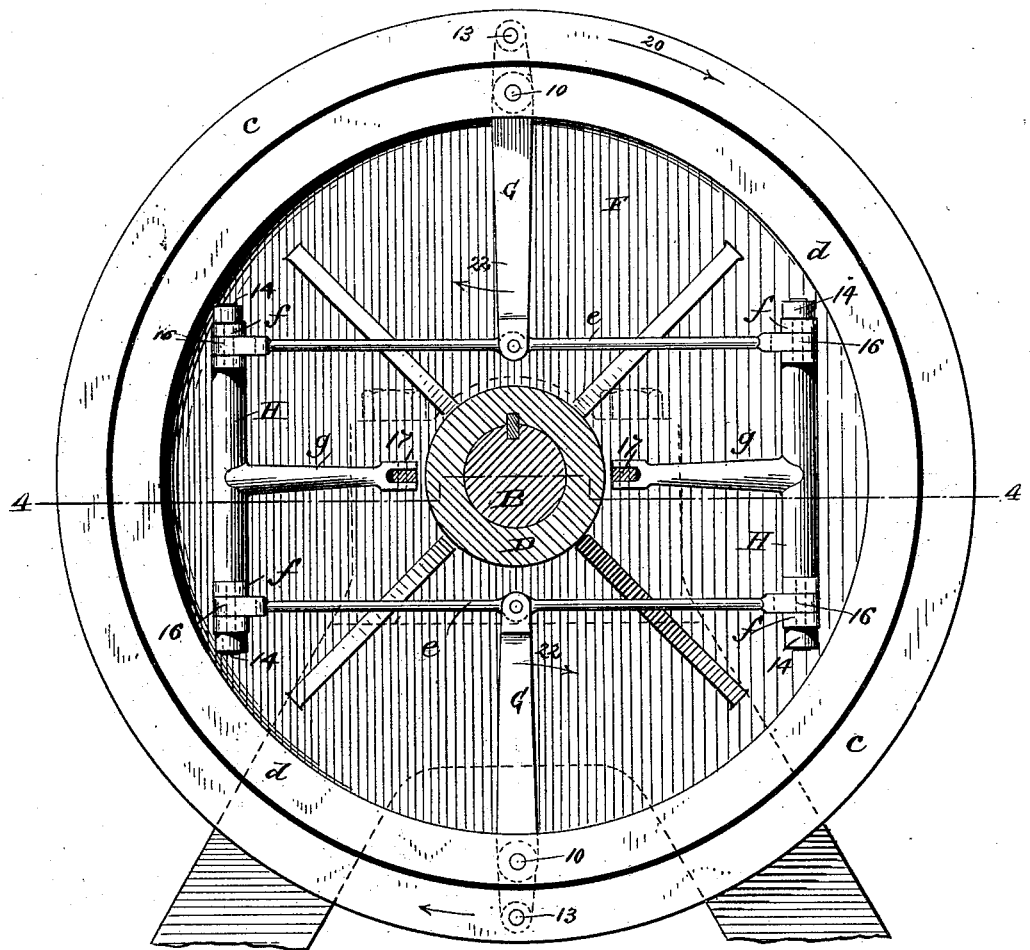
Figure 4:
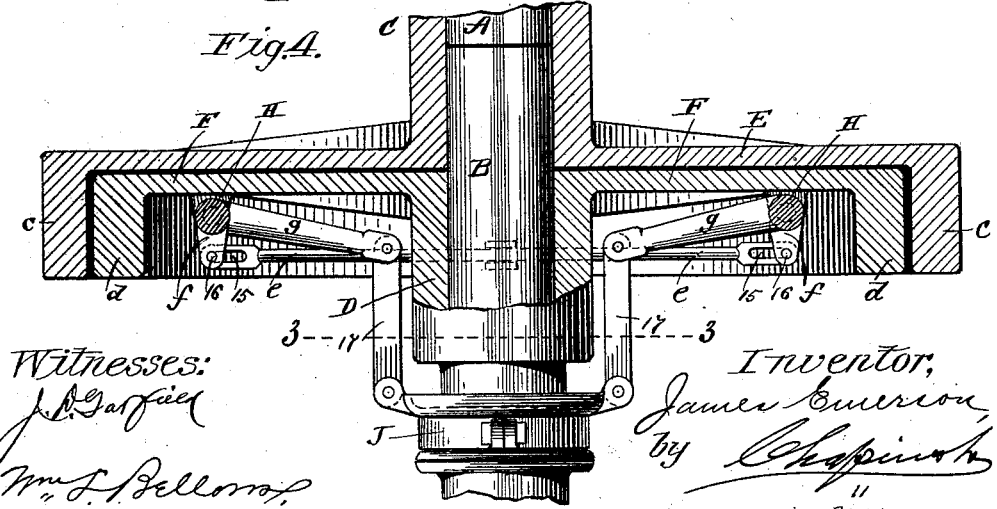

Figure 1 is a side elevation of the dynamometer and automatic registering mechanism. Fig. 2 is an elevation of the said parts, looking at the left-hand end thereof with relation to its position as seen in Fig. 1. Fig. 3 is an elevation of the parts of the apparatus comprising the mechanism for primarily and momentarily indicating the resistance, as seen at right angles to the shaft, the shaft and hub and certain connecting-rods being shown in section as taken on the lines 3 3, indicated on Figs. 1 and 4, which latter view, Fig. 4, is a vertical sectional view taken on the plane indicated by the line 4 4 of Fig. 3. Figs. 5, 6, and 7 are views of parts in detail to be hereinafter referred to.

In order that the registering mechanism of the present invention may be readily understood in its relation to a dynamometer of which it forms a supplement, a form of dynamometer will be now described which comprises mechanism for indicating but momentarily the force in transmission necessary to overcome the resistance present in the machine to which such resistance is so imparted, and which mechanism for securing such momentary indication forms the subject of a separate application for Letters Patent of the United States, filed by me August 15, 1889, Serial No. 320,867.

In the drawings, A represents the primary shaft for transmitting power from the steam-engine or other dynamic means to and through the secondary shaft B, which is or may be the driving-shaft of a machine or a series of machines, parts of the dynamometer acting as a coupling between the said axially-arranged shafts A B, as will shortly appear. The said dynamometer comprises, among other parts to be hereinafter mentioned or described, two hubs, one C of which is keyed or otherwise secured on the primary shaft A, and the other hub D is secured on the secondary shaft B. The said hub C at one end is provided with a disk or spider-frame having its outer rim formed into a flange $c$, concentric with and extended over and toward said hub D, and within said flanged spider-frame E is disposed another disk or spider-frame F, which is formed on the said hub D, the said disk F also having a flange $d$, forming its outer rim and lying within the flange $c$ of the disk E, the outer periphery of said flange $d$ being slightly separated from the inner periphery of the flange $c$.

Located in coincident radial lines intersecting the common axis of the shafts A B and in a plane near the face of the disk F are two levers G G, the inner ends of which lie near the surface of the hub D, while the outer end portions thereof pass through and outwardly beyond the flange d, being pivotally connected to said flange, as at 10, and into apertures 12 in said flange on the disk E, and by the pins 13 connected thereto, it being noted that the inner arm of each lever is several times longer than the outer arm. To the inner ends of both of the said levers G are connected by the middles thereof two rods e e, which range in parallelism at right angles to said levers, and the ends of said rods e are connected to the short arms f, which project radially from rocker-shafts H and about perpendicularly from the length of the said rods e, having bearings for their rolling motions in studs or ear-pieces 14 14, affixed to the face of the disk F; or, in other words, there are two parallel rocker-shafts at opposite sides of the hub D, standing in lines parallel with and outside of said radially-aligned levers G, each rocker-shaft having a short radial or crank-arm f at each end, and to the corresponding end arms f on the opposing rocker-shafts the rods e are connected by their ends, said rods midway thereof being pinned to the ends of said levers G. The connection between each end of each rod e with its respective arm f is by forming a slot 15 in the end of the rod and passing a pin 16 through the arm f and through said slot, it being noticed in Figs. 3 and 4 that when the dynamometer is not operating to indicate transmitted force the outer end walls of all of said slots 15 15 lie against their respective pins 16. Both of said rocker-shafts H H are provided intermediately thereof with radial arms g g, which are in a common plane intersecting the axial line of the shafts A B, and said arms extend inwardly toward the hub D and in lines oblique to the disk F, and to both of said radial arms g g the extremities of connecting-rods 17 17 are secured, which by their other ends are connected to a power-indicating element, which in the present instance is comprised in a sleeve J, movable axially on a longitudinal extension of the hub D.

It will be apparent from the description of the construction hereinabove given that on the rotation of the shaft with any given or sufficient power before the disk F and shaft B will receive its rotation from the shaft A the levers G will be swung on their pivots 10 through the force exerted by the shaft A on the flange c until the resistance to swing such levers G farther is equal that required to rotate the shaft B, when the said shafts A B will move in unison. If in running a greater resistance is placed on the shaft B, the levers G will be swung more and farther out of their common radial alignment, while if the resistance becomes lessened, the said levers will swing toward their common radial alignment. For instance, if the shaft and disk are rotated in the direction indicated by the arrow 20, Fig. 3, the levers G will be swung as indicated by the arrows 22 22. Then, with reference to the particular position of the parts shown in Fig. 3, the upper rod e will be drawn to the left, its right-hand end working on the pin 16 of the upper arm f of the right-hand rock-shaft H, and the lower rod e will be drawn to the right, its left-hand end working on the pin 16 of the lower arm f of the other and left-hand rock-shaft H, the slots 15 in the left-hand end of the upper rod e and in the right-hand end of lower rod e permitting free movements of the said portions of such rods over the pins 16 of the adjacent and corresponding rocker-shaft arms f. Therefore on rotating the shaft A, in the reverse directions to those indicated by the arrows 22, when the left-hand end of the upper rod e and the right-hand end of the lower rod e will draw on the upper left-hand and lower right-hand rock-shaft levers f; and in either the forward or backward rotation of the primary shaft A the rock-shafts H H will roll in directions to cause, through the connecting means described, the sleeve to move toward the disk F at all times of indicating the transmission of an increase of force from the primary to the secondary shaft, and to cause the sleeve to move away from the disk at times of indicating the transmission of a decreasing force from the primary to the secondary shaft. Therefore it will be seen that the dynamometer is adapted to operate equally as well on a reversed as on a forward rotation of the primary shaft.

The mechanism thus far described in detail constitutes the essentials of the invention forming the subject-matter of the hereinbefore-mentioned application for patent.

Beyond the longitudinal extension of the hub D, on which is the sleeve J, is loosely placed a hub consisting of two separated portions K K', between which is disposed a hub L, a portion of which is peripherally formed into a worm-screw, as at l, and from the said two-part hub K K' are also two pending brackets m m', each of which also extends farther downwardly in supplemental bracket-arms 30 32. Pivotally supported on the bracket-arm m is an angular lever M, one fork-shaped arm 33 of which upwardly projects into an engagement with a split ring o, encircling the sleeve J and held against axial movement thereof by the flanges 34 34 on said sleeve. The horizontally-extended arm 35 of said angular lever M is formed at its end 36 into a sector-gear, which engages with a movable shield H', consisting of a disk axially mounted on a stud p on the bracket m', one portion of its periphery being formed with gear-teeth 37, with which the teeth on the portion of the arm 35, comprising the sector, may mesh, and another portion of its periphery is laterally extended, or of flange form, as particularly shown at q, Figs. 5, 6, and 7. Rigidly attached to said shield-disk is an arm r, having a bulb near its end resembling a pendulum and terminating in an index-pointer 38. Moving as one with said horizontal arm 35 of the angular lever, but formed, preferably, separately therefrom, is another arm 39, to the outer end of which is pivotally connected a pendent rod P, the lower end of which is formed into a piston 40, that closely fits the interior wall of a dash-pot Q, which is to be filled with oil or similar liquid, the said dash-pot being immovably supported from the bracket-extension 32. Above the dash-pot the rod P is provided with a flange-rest 42, on which removable counterpoise-weights 44 44 may be supported to modify the resistance exerted by the power through the primary shaft to the shaft B necessary to affect to any given degree the indicating mechanism of the dynamometer now being described.

Supported between suitable portions of the brackets or the extensions thereof is an indicating-dial R, of quadrant form, the curve of which is generated from the pivotal point coincident with pin $p$ of the said shield-disk, and on which the pendulum-rod swings, said quadrant dial being graduated or divided and subdivided in its length or a portion thereof, as shown. Mounted for rotation on the said stud $p$, which supports the shield-disk H′, or otherwise supported so as to rotate independent of said shield-disk, is a finely-toothed ratchet-wheel S. On a bracket $s$, upwardly extended from the hub K, is a worm-wheel T, meshing with the worm-screw $l$ on the shaft B, and on the side of said worm-wheel (or more specifically, as shown in Fig. 2, on a disk 45, laterally extended therefrom) is an eccentric-pin 46, to which is connected one end of a drag or pawl-rod $t$, the other end of which is of a hook form, as shown in 47, said hooked end lying either in contact with the outer face of the shield-disk flange $q$ or in contact or engagement with the teeth of said ratchet-wheel S, according to the conditions, as will hereinafter more fully appear.

$x$ and $y$ represent registering-counters, each of which may be of the same well-known constructions as those employed to register piston-strokes of steam-engines or the rotations of the main shaft thereof and of other machines, each of which counters is provided with a reciprocatory arm 49 or 50, attached to its operating-shaft.

On the stud or shaft $p$, supporting the shield-disk, and to which the said ratchet-wheel S is affixed, is a face-plate 52, having an eccentric-pin 53 thereon to which one end of a pitman-rod 54 is connected, the other end thereof being attached to the operating-arm 49 of the counter-register $x$, so that on each complete rotation of the ratchet-wheel S the counter-register $x$ will be operated to bring to view the next successive number. On the arbor $u$, on which the worm-wheel T and face-plate 45 are attached, is also another face-plate $53^a$, to the eccentric-pin $54^a$ of which one end of a pitman-rod 55 is connected, the other end being attached to the operating-arm 50 of the counter-register $y$, so that on each rotation of the worm-wheel T the counter will be operated to bring to view the next successive number.

From the description of the mechanism hereinabove given it will be understood that the number of rotations of the primary shaft A and of the secondary shaft B may be indicated and registered. If, as in practice is the case, each rotation of the shafts A and B through the worm-screw $l$ moves the worm-wheel T one-hundredth of a rotation, said latter wheel having one hundred teeth therein, on starting the counter-register $y$ at 0 and running for a time, the number then registered would stand for hundreds of rotations, and if the counter-register indicates, say, the number 12,035 it is to be computed that 1,203,500 rotations have been made, and then, knowing the velocity of the primary shaft and its diameter, or of its driving-pulley, readily, the given feet that a given quantity of power (as indicated by the other counter-register $x$ in the manner to be next described) has been carried may be computed.

In the transmission of power from the primary to the secondary shaft, more or less and variable, as the case may be, the extent of the sliding movement of the sleeve J, as is now plain, governs, of course, the extent of the partial rotation of the shield-disk H′ and the swing of the pendulum-pointer. The normal position of said shield-disk, or its position at the time no power is in transmission, is such as to place the flange $q$ so that it will cover the reciprocatory movement of the hooked end of the pitman $t$, the forward end of such flange being coincident with the position of the pitman-hook when in its extreme forward movement; but according as the power is more or less so more or less will the said shield-disk be turned on its axis and the shield-flange moved rearwardly to uncover more or less of the teeth of the ratchet-wheel S, permitting the hooked end of the said rod to engage the rearward uncovered tooth and to carry such tooth forward a distance corresponding to the limit of its forward movement. Therefore if under the utmost swing of the angular lever M, whereby the pendulum would be caused to indicate a maximum transmission of power within the limits of the capabilities of the dynamometer under the then-present adjustment, the shield-disk would be turned to expose teeth covering a circumferential extent on the ratchet equal to the traverse of the reciprocatory pawl-rod $t$, and if such maximum circumferential extent comprises ten ratchet-teeth on the forward draw of the pawl-rod $t$ the ratchet-wheel will be caused to rotate to a corresponding extent. Therefore, if there are one hundred teeth in the ratchet and the shield-disk is so exposed that ten teeth may be engaged by the pawl-rod, the partial rotation of the ratchet-wheel will be equal to one-tenth of a whole rotation, and it will be readily understood that under the transmission of less power the shield-disk will expose a smaller number of ratchet-teeth for the engagement of the pawl-rod, and the ratchet-wheel will be turned to a less extent, such extent of rotation of the said ratchet being always dependent on the amount of power in transmission, and the greater such power the sooner will the ratchet be caused to make one rotation, and each complete rotation of the said ratchet-wheel will, through the pitman-rod connection 54, operate the counter-arm 49 and cause the registration of the next succeeding number in the counter-register $x$.

The amount of power—say in pounds—required to be expended to cause one rotation of the ratchet-wheel S to once operate the counter $x$ having been determined, and the velocity or number of rotations that the shaft has made in a certain time being shown by the counter-register $y$ on noting on the counter-register $x$ the number of rotations indicated as having been made by the ratchet S, which are indications of both force and resistance, the computation can be readily made for the reduction of the figures indicated by the counter-registers to horse-power or other dynamometrical units.

I claim—

1. In a dynamometer, the combination, with a movable part thereof—as, for instance, the sleeve J—actuated and governed by the force in transmission, substantially as described, of the ratchet-wheel and a counter-register, a shield-disk for said ratchet-wheel, having a flange overlying a portion of the ratchet-teeth, a means of connection for imparting from the above-mentioned sleeve a proportionately-corresponding extent of rotation to said disk, a reciprocating pawl operating, substantially as described, with relation to said shield-flange and said ratchet-teeth and connection, means between said ratchet-wheel and counter-register for securing from the rotation of the said wheel an actuation of said register-counter, substantially as and for the purpose described.

2. In a dynamometer, the combination, with a movable part thereof—as, for instance, the sleeve J—actuated and governed by the force in transmission, substantially as described, of the ratchet-wheel and a counter-register, a shield-disk for said ratchet-wheel, having a flange overlying a portion of the ratchet-teeth and having a portion of its periphery formed with gear-teeth, the angular lever M, intermediately pivoted, one arm of which engages said movable part of the dynamometer and the other arm of which has its extremity formed to constitute a sector-gear engaging the teeth on said disk, a reciprocating pawl operating, as described, with relation to said shield-flange and to the teeth of said ratchet-wheel, and means of connection between said ratchet-wheel and counter-register, substantially as described, for the purpose set forth.

3. In a dynamometer, the combination, with a movable part thereof, as the sleeve J, actuated and governed by the force in transmission, substantially as described, of the ratchet-wheel having on its arbor a face-plate provided with an eccentric-pin and a counter-register, a shield-disk for said ratchet-wheel, having a flange overlying a portion of the ratchet-teeth, means, substantially as described, for imparting from the above-mentioned movable part a proportionately-corresponding extent of rotation to said disk, a reciprocating pawl operating, substantially as described, with relation to said shield-flange and said ratchet-teeth, and a pitman-rod between the said eccentric-pin and the operating-arm of the counter-register, substantially as described.

4. The combination, with a driving and a driven shaft and a dynamometer interposed, having a movable part therein—such, for instance, as the sleeve J—actuated and governed as to the extent of its movements by the force in transmission, of a counter-register and mechanism interposed between said movable part and counter-register, and also having a connection with one of said shafts, whereby during the rotation of said shafts said mechanism is given a continuous action to operate said counter-register, parts of said intervening mechanism being governed by said movable part of the dynamometer, so that on an increase or diminution of the force in transmission said mechanism parts will have increased or diminished extents of movement, and whereby more or less frequent actuations of the counter-register will occur, substantially as and for the purpose described.

5. In combination, a driving and a driven shaft, one of which shafts has thereon the worm $l$, a dynamometer applied on and between said shafts, comprising therein a movable part—as, for instance, the sleeve J—actuated and governed by the force in transmission, substantially as described, a worm-wheel meshing with said worm and having on its arbor a crank or eccentric-pin, a ratchet-wheel, and a counter-register, a shield-disk for said ratchet-wheel, having a flange overlying a portion of the ratchet-teeth, means, substantially as described, for imparting from the above-mentioned sleeve or its equivalent a corresponding extent of rotation to said disk, the pawl-rod $t$, by one end connected to said crank or eccentric-pin and by its other end operating, substantially as described, with relation to said shield-flange and said ratchet-teeth, and means of connection for securing from the rotation of said ratchet-wheel an actuation of said register-counter, substantially as described.

6. In combination, a driving and a driven shaft, one of which shafts has thereon the worm $l$, a dynamometer applied on and between said shafts, comprising therein a movable part—as, for instance, the sleeve J—actuated and governed by the force in transmission, substantially as described, a worm-wheel meshing with said worm and having on its arbor two cranks or eccentric-pins, a ratchet-wheel, and two counter-registers, a shield-disk for said ratchet-wheel, having a flange overlying a portion of the ratchet-teeth, means, substantially as described, for imparting from the above-mentioned sleeve or its equivalent a corresponding extent of rotation to said disk, the pawl-rod $t$, by one end connected to one of said eccentric-pins and by its other end operating, substantially as described, with relation to said shield-flange and said ratchet-teeth, means of connection for securing from the rotation of said ratchet-wheel an actuation of one of said counters, and a pitman-rod connected to the other of said cranks or eccentric-pins and to the actuating-arm of the other of said counter-registers, substantially as and for the purpose set forth.

7. In combination, the shafts A B and a dynamometer interposed between and connecting said shafts, having a movable part therein—such, for instance, as the sleeve J—actuated and governed as to the extent of its movements by the force in transmission, the worm $l$, fixed on the shaft B, and the hub K K', provided with suitable supporting-brackets, the worm-wheel T, having on its arbor the cranks or eccentric-pins 46 and $54^a$, the ratchet-wheel having on its arbor a crank or eccentric-pin 53, and the shield-disk provided with the flange $q$ and gear-teeth, the angular lever M, one arm of which engages the said sleeve J and the other has its extremity of sector-gear form engaging the said disk-teeth, the pawl $t$, by one end connected to the eccentric-pin 46 and operating with relation to the ratchet-teeth and shield-flange, substantially as described, two counter-registers $x$ and $y$, and a pitman-rod between the ratchet-wheel eccentric-pin and the actuating-arm of the register $x$, and a pitman-rod between the worm-wheel eccentric-pin and the actuating-arm of the said register $y$, all arranged for operation substantially as and for the purpose set forth.

JAMES EMERSON.

Witnesses:
H. A. CHAPIN,
WM. S. BELLOWS.